US012587649B2

(12) United States Patent (10) Patent No.: US 12,587,649 B2
Sharman et al. (45) Date of Patent: Mar. 24, 2026

(54) DATA ENCODING AND DECODING

(71) Applicant: Sony Corporation, Tokyo (JP)

(72) Inventors: Karl James Sharman, East Ilsley (GB); Magali Kimlee Miri Philippe, Basingstoke (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 18/592,128

(22) Filed: Feb. 29, 2024

(65) Prior Publication Data

US 2024/0205408 A1 Jun. 20, 2024

Related U.S. Application Data

(63) Continuation of application No. 16/965,510, filed as application No. PCT/GB2019/050181 on Jan. 23, 2019, now Pat. No. 11,924,430.

(30) Foreign Application Priority Data

Feb. 5, 2018 (GB) ...................................... 1801839

(51) Int. Cl.
H04N 19/13 (2014.01)
H04N 19/157 (2014.01)
(Continued)

(52) U.S. Cl.
CPC .......... H04N 19/13 (2014.11); H04N 19/157 (2014.11); H04N 19/50 (2014.11); H04N 19/61 (2014.11)

(58) Field of Classification Search
CPC ...... H04N 19/13; H04N 19/157; H04N 19/50; H04N 19/61; H04N 19/12; H04N 19/129;
(Continued)

(56) References Cited

U.S. PATENT DOCUMENTS 7,483,584 B2 * 1/2009 Chen .................... H04N 19/136
382/245
9,167,253 B2 * 10/2015 Sole Rojals ........... H04N 19/44
(Continued)

FOREIGN PATENT DOCUMENTS

CN 103621086 A 3/2014
CN 105850125 A 8/2016
(Continued)

OTHER PUBLICATIONS

International Search Report issued on Apr. 18, 2019 in PCT/GB2019/050181 filed on Jan. 23, 2019.
(Continued)

*Primary Examiner* — Dramos Kalapodas
(74) *Attorney, Agent, or Firm* — Oblon, McClelland, Maier & Neustadt, L.L.P.

(57) ABSTRACT

A data encoding method comprises: encoding an ordered array of data values as data representing a data value magnitude and data representing a data value sign; predicting, for a set of data values comprising at least some of the data values, the respective data value sign from a property of one or more other data values in the ordered array; and encoding the data value sign for the set of data values in dependence upon the respective predicted value.

18 Claims, 13 Drawing Sheets

(51) Int. Cl.
H04N 19/50 (2014.01)
H04N 19/61 (2014.01)

(58) Field of Classification Search
CPC ...... H04N 19/18; H04N 19/593; H04N 19/91; H04N 19/70
See application file for complete search history.

(56) References Cited

U.S. PATENT DOCUMENTS

| | | | | |
|---|---|---|---|---|
| 10,616,604 | B2 * | 4/2020 | Zhang | H04N 19/593 |
| 2006/0039614 | A1 | 2/2006 | Withers et al. | |
| 2007/0223582 | A1 | 9/2007 | Borer | |
| 2013/0003834 | A1 | 1/2013 | Rojals et al. | |
| 2013/0003835 | A1 | 1/2013 | Sole Rojals et al. | |
| 2013/0294524 | A1 | 11/2013 | Van Der Auwera | |
| 2014/0003533 | A1 | 1/2014 | He | |
| 2014/0286413 | A1 | 9/2014 | Joshi | |
| 2015/0078447 | A1 * | 3/2015 | Gamei | H04N 19/80 375/240.12 |
| 2015/0103917 | A1 | 4/2015 | Wang et al. | |
| 2015/0103918 | A1 | 4/2015 | Wang et al. | |
| 2015/0181237 | A1 * | 6/2015 | Tsukuba | H04N 19/134 382/233 |
| 2016/0050427 | A1 * | 2/2016 | Berry | H04N 19/42 375/240.01 |
| 2016/0277736 | A1 | 9/2016 | Henry | |
| 2016/0353109 | A1 | 12/2016 | Berry et al. | |
| 2017/0142448 | A1 * | 5/2017 | Karczewicz | H04N 19/91 |
| 2017/0374369 | A1 | 12/2017 | Chuang | |
| 2018/0176582 | A1 | 6/2018 | Zhao | |
| 2018/0205962 | A1 * | 7/2018 | Rissa | H04N 19/423 |
| 2019/0014322 | A1 | 1/2019 | Berry et al. | |
| 2019/0089959 | A1 | 3/2019 | Berry et al. | |

FOREIGN PATENT DOCUMENTS

| | | | |
|---|---|---|---|
| JP | | 2016092589 A | 5/2016 |
| JP | | 2016519514 A | 6/2016 |
| WO | WO | 2013/003584 A1 | 1/2013 |
| WO | WO | 2013/003819 A1 | 1/2013 |
| WO | WO | 2017083710 A1 | 5/2017 |

OTHER PUBLICATIONS

Sze et al., "High Efficiency Video Coding (HEVC) Algorithms and Architectures", Integrated Circuits and Systems, Springer, 2014, ISBN: 978-3-319-06894-7, pp. 209-274 (70 total pages).

"High efficiency video coding", Series H: Audiovisual and Multimedia Systems, Infrastructure of audiovisual services—Coding of moving video, Recommendation ITU-T H.265, 2016, pp. 1-643 (662 total pages).

Chen et al., "Algorithm Description of Joint Exploration Test Model 1", Joint Video Exploration Team (JVET) of ITU-T SG 16 WP 3 and ISO/IEC JTC 1/SC 29/WG 11, JVET-A1001, 2015, pp. 1-25 (27 total pages).

Cao et al., "CE6.b1 Report on Short Distance Intra Prediction Method", Joint Collaborative Team on Video Coding (JCT-VC) of ITU-T SG16 WP3 and ISO/IEC JTC1/SC29/WG11, JCTVC-E278, 2011, pp. 1-7.

Flynn, David et al. , Overview of the Range Extensions for the HEVC Standard: Tools, Profiles, and Performance , IEEE Transactions on Circuits and Systems for Video Technology , IEEE , Jan. 2016 , vol. 26, No. 1 , pp. 4-19 , [online] , [retrieved on May 8, 2023].

Zhao, Liang et al. , Improved Intra Transform Skip Mode in HEVC , Proc. ICIP 2013 , IEEE , Feb. 13, 2014 , pp. 2010-2014 , [online] , [retrieved on May 8, 2023].

Detlev Marke et al., Overview of the Range Extensions for the HEVC Standard: Tools, Profiiles ANS Performance:—IDS—(Year: 2020).

Liang Zhao et al., :"Improved Intra Transform Skip Mode in HEVC", Mediatek, Beijing, China (C) IEEE—IDS—(Year: 2013).

* cited by examiner

0 = Planar
1 = DC

0 = Planar
1 = DC

2000

2000

Last X/Y Position 2700

EMT & NSST 2710

Any Coefficients 2720

Sig map 2730

>1 map 2740

>2 map 2750

Coefficients Remaining 2760

Sign bits 2770

2800

DATA ENCODING AND DECODING

CROSS REFERENCE TO RELATED APPLICATIONS

This application is a continuation of U.S. patent application Ser. No. 16/965,510, filed Jul. 28, 2020, which is a National Stage of International Application No. PCT/GB2019/050181, filed Jan. 23, 2019, which claims the benefit of Priority from United Kingdom Patent Application No. 1801839.0 filed Feb. 5, 2018. The entire contents of each of which are incorporated herein by reference.

BACKGROUND

Field

This disclosure relates to image data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several video data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figures 1, 2, 3, 4, 5, 6:
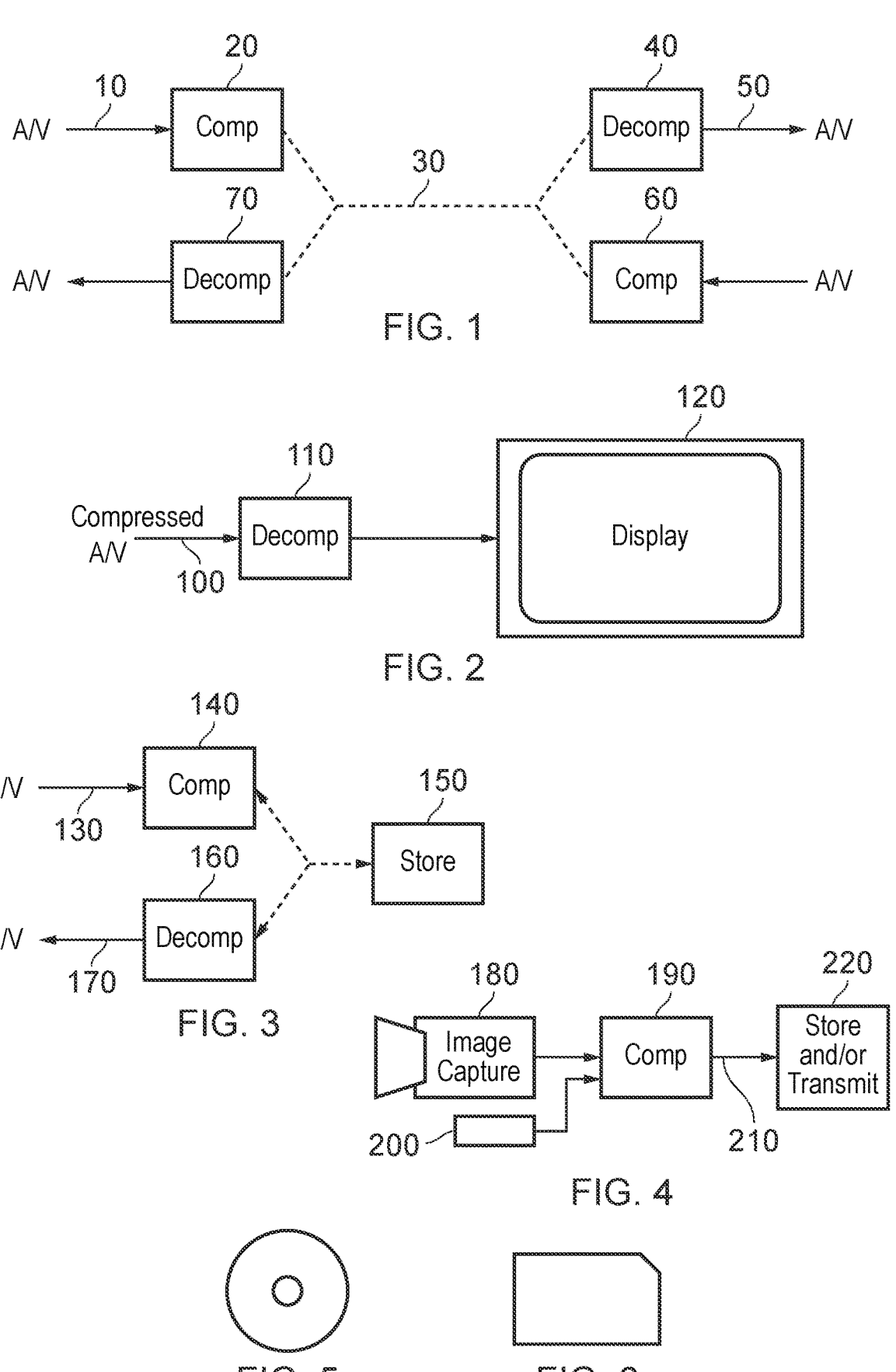
FIG. 1 schematically illustrates an audio/video (A/V) data transmission and reception system using video data compression and decompression.
FIG. 2 schematically illustrates a video display system using video data decompression.
FIG. 3 schematically illustrates an audio/video storage system using video data compression and decompression.
FIG. 4 schematically illustrates a video camera using video data compression.
FIGS. 5 and 6 schematically illustrate storage media.

Referring now to the drawings, FIGS. 1-4 are provided to give schematic illustrations of apparatus or systems making use of the compression and/or decompression apparatus to be described below in connection with embodiments of the present technology.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression. In this example, the data values to be encoded or decoded represent image data.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unidirectional, only one of the nodes would require a compression apparatus and the other node would only require a decompression apparatus.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 may be provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

FIG. 4 therefore provides an example of a video capture apparatus comprising an image sensor and an encoding apparatus of the type to be discussed below. FIG. 2 therefore provides an example of a decoding apparatus of the type to be discussed below and a display to which the decoded images are output.

A combination of FIGS. 2 and 4 may provide a video capture apparatus comprising an image sensor 180 and encoding apparatus 190, decoding apparatus 110 and a display 120 to which the decoded images are output.

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Therefore, the above arrangements provide examples of video storage, capture, transmission or reception apparatuses embodying any of the present techniques.

Figure 7:
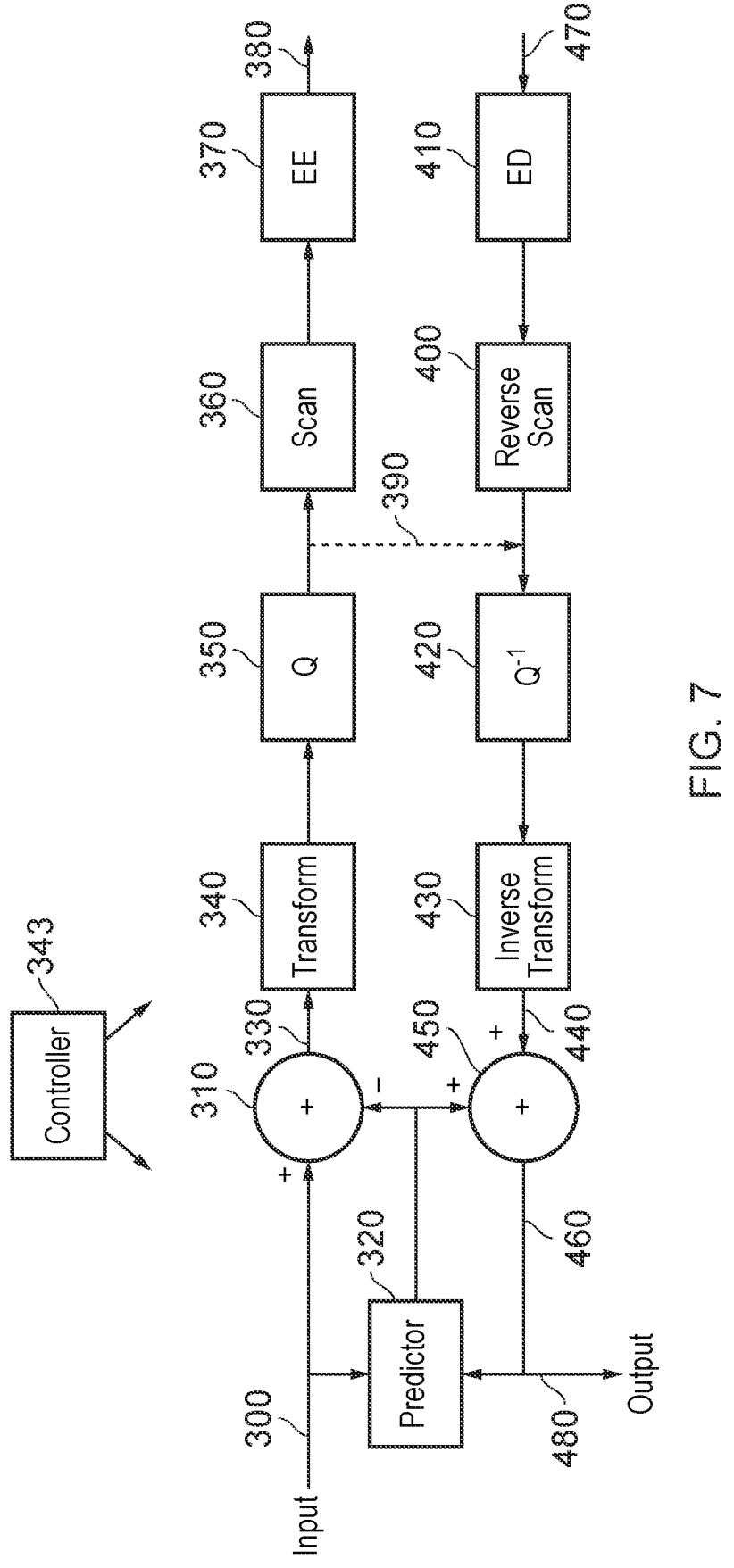
FIG. 7 provides a schematic overview of a video data compression and decompression apparatus.

FIG. 7 provides a schematic overview of a video or image data compression and decompression apparatus, for encoding and/or decoding image data representing one or more images.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 may use features from the apparatus of FIG. 7. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

Therefore, encoding (using the adder 310) involves predicting an image region for an image to be encoded; and generating a residual image region dependent upon the difference between the predicted image region and a corresponding region of the image to be encoded. In connection with the techniques to be discussed below, the ordered array of data values comprises data values of a representation of the residual image region. Decoding involves predicting an image region for an image to be decoded; generating a residual image region indicative of differences between the predicted image region and a corresponding region of the image to be decoded; in which the ordered array of data values comprises data values of a representation of the residual image region; and combining the predicted image region and the residual image region.

The remainder of the apparatus acting as an encoder (to encode the residual or difference image) will now be described. The residual image data 330 is supplied to a transform unit or circuitry 340 which generates a discrete cosine transform (DCT) representation of blocks or regions of the residual image data. The DCT technique itself is well known and will not be described in detail here. Note also that the use of DCT is only illustrative of one example arrangement. Other transforms which might be used include, for example, the discrete sine transform (DST). A transform could also comprise a sequence or cascade of individual transforms, such as an arrangement in which one transform is followed (whether directly or not) by another transform. The choice of transform may be determined explicitly and/or be dependent upon side information used to configure the encoder and decoder.

Therefore, in example, an encoding and/or decoding method comprises predicting an image region for an image to be encoded; and generating a residual image region dependent upon the difference between the predicted image region and a corresponding region of the image to be encoded; in which the ordered array of data values (to be discussed below) comprises data values of a representation of the residual image region.

The output of the transform unit 340, which is to say, a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called up-right diagonal scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420. In instances where loss or potential loss is introduced by a stage, that stage may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantiser 420 and an inverse transform unit or circuitry 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320, as will be described below.

Turning now to the process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480. In practice, further filtering may optionally be applied (for example, by a filter 560 shown in FIG. 8 but omitted from FIG. 7 for clarity of the higher level diagram of FIG. 7) before the signal is output.

Figure 8:
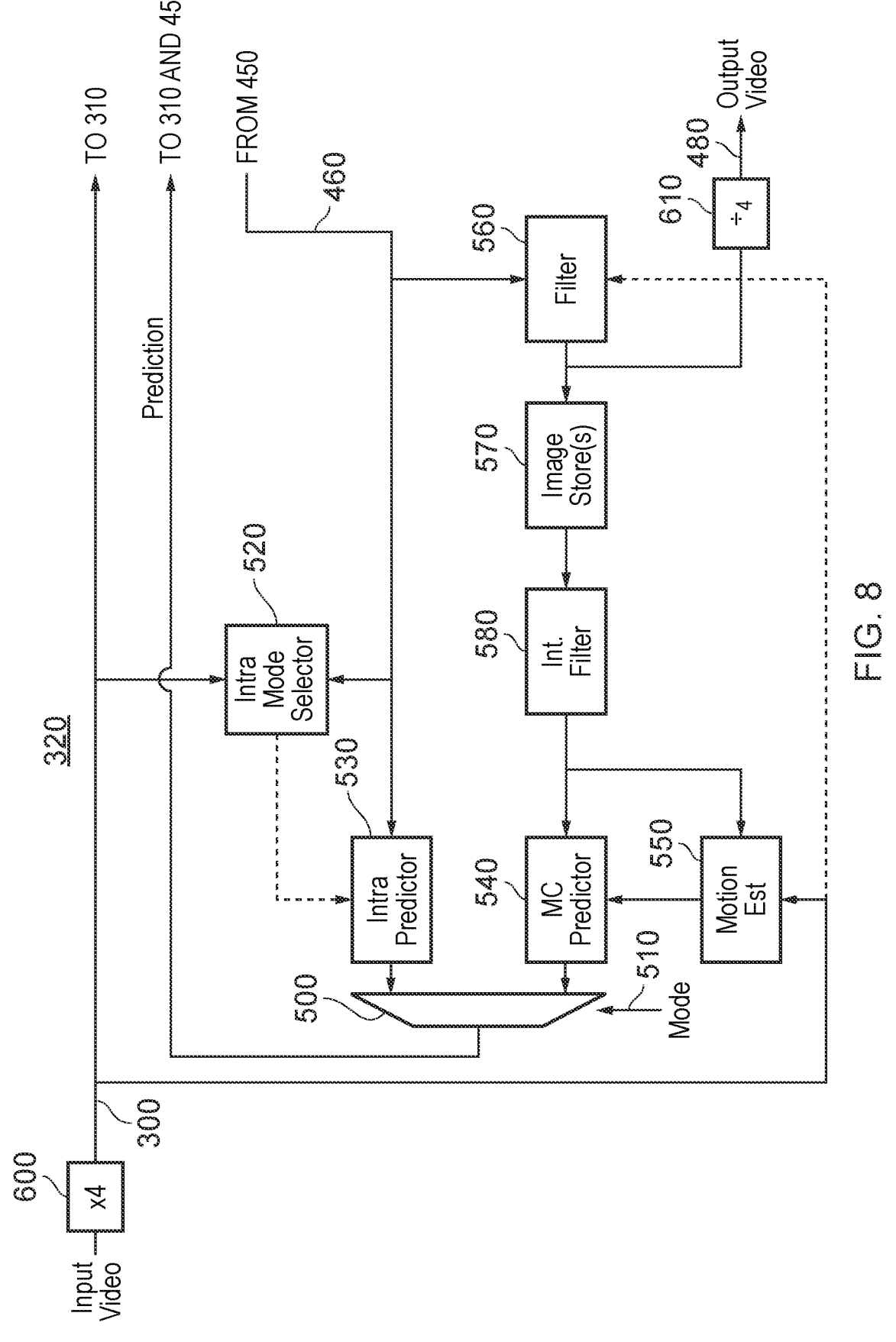
FIG. 8 schematically illustrates a predictor.

The apparatus of FIGS. 7 and 8 can act as a compression (encoding) apparatus or a decompression (decoding) apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output data-stream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described. Firstly, the signal is optionally filtered by a filter unit 560, which will be described in greater detail below. This involves applying a "deblocking" filter to remove or at least tend to reduce the effects of the block-based processing carried out by the transform unit 340 and subsequent operations. A sample adaptive offsetting (SAO) filter may also be used. Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

The filtered output from the filter unit 560 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in SERIES H: AUDIOVISUAL AND MULTIMEDIA SYSTEMS Infrastructure of audiovisual services—Coding of moving video High efficiency video coding Recommendation ITU-T H.265 December 2016. Also: High Efficiency Video Coding (HECV) algorithms and Architectures, Editors: Madhukar Budagavi, Gary J. Sullivan, Vivienne Sze; ISBN 978-3-319-06894-7; 2014 which is incorporated herein in its entirety by reference. In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are available for selection. In other example arrangements, blocks or regions of different shapes such as rectangular blocks (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

The intra-prediction process will now be discussed. In general terms, intra-prediction involves generating a prediction of a current block of samples from previously-encoded and decoded samples in the same image.

Figure 9:
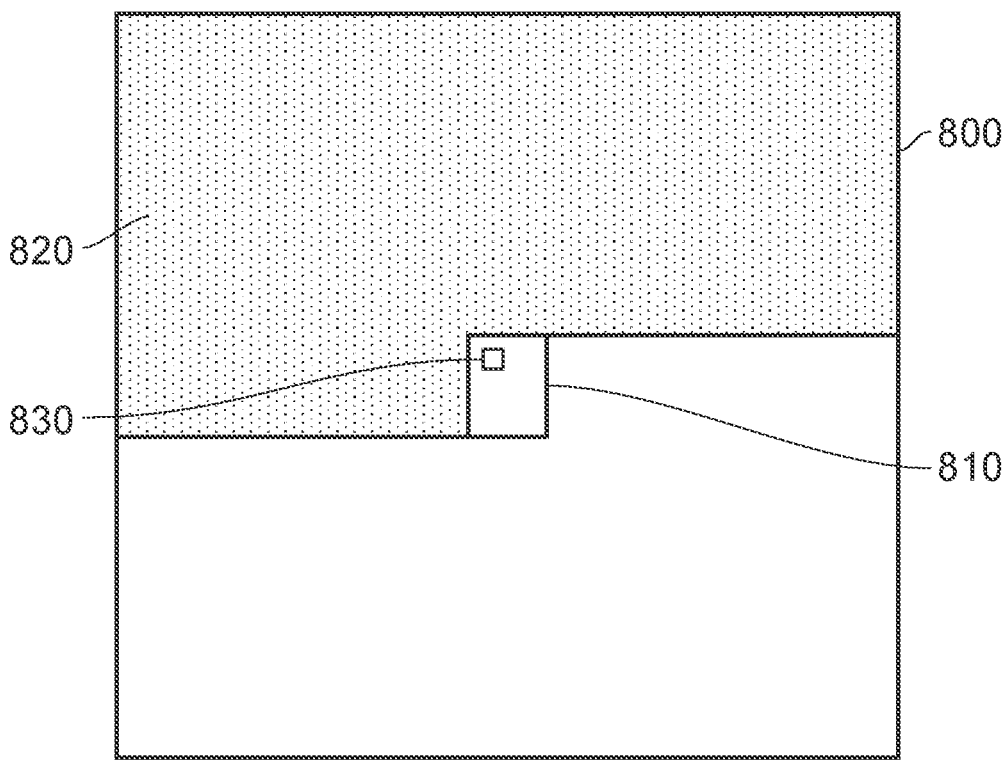
FIG. 9 schematically illustrates a partially-encoded image.

FIG. 9 schematically illustrates a partially encoded image 800. Here, the image is being encoded from top-left to bottom-right on a block by block basis. An example block encoded partway through the handling of the whole image is shown as a block 810. A shaded region 820 above and to the left of the block 810 has already been encoded. The intra-image prediction of the contents of the block 810 can make use of any of the shaded area 820 but cannot make use of the unshaded area below that.

In some examples, the image is encoded on a block by block basis such that larger blocks (referred to as coding units or CUs) are encoded in an order such as the order discussed with reference to FIG. 9. Within each CU, there is the potential (depending on the block splitting process that has taken place) for the CU to be handled as a set of two or more smaller blocks or transform units (TUs). This can give a hierarchical order of encoding so that the image is encoded on a CU by CU basis, and each CU is potentially encoded on a TU by TU basis. Note however that for an individual TU within the current coding tree unit (the largest node in the tree structure of block division), the hierarchical order of encoding (CU by CU then TU by TU) discussed above means that there may be previously encoded samples in the current CU and available to the coding of that TU which are, for example, above-right or below-left of that TU.

The block 810 represents a CU; as discussed above, for the purposes of intra-image prediction processing, this may be subdivided into a set of smaller units. An example of a current TU 830 is shown within the CU 810. More generally, the picture is split into regions or groups of samples to allow efficient coding of signalling information and transformed data. The signalling of the information may require a different tree structure of sub-divisions to that of the transform, and indeed that of the prediction information or the prediction itself. For this reason, the coding units may have a different tree structure to that of the transform blocks or regions, the prediction blocks or regions and the prediction information. In some examples the structure can be a so-called quad tree of coding units, whose leaf nodes contain one or more prediction units and one or more transform units; the transform units can contain multiple transform blocks corresponding to luma and chroma representations of the picture, and prediction could be considered to be applicable at the transform block level. In examples, the parameters applied to a particular group of samples can be considered to be predominantly defined at a block level, which is potentially not of the same granularity as the transform structure.

The intra-image prediction takes into account samples coded prior to the current TU being considered, such as those above and/or to the left of the current TU. Source samples, from which the required samples are predicted, may be located at different positions or directions relative to the current TU. To decide which direction is appropriate for a current prediction unit, the mode selector 520 of an example encoder may test all combinations of available TU structures for each candidate direction and select the prediction direction and TU structure with the best compression efficiency.

The picture may also be encoded on a "slice" basis. In one example, a slice is a horizontally adjacent group of CUs. But in more general terms, the entire residual image could form a slice, or a slice could be a single CU, or a slice could be a row of CUs, and so on. Slices can give some resilience to errors as they are encoded as independent units. The encoder and decoder states are completely reset at a slice boundary. For example, intra-prediction is not carried out across slice boundaries; slice boundaries are treated as image boundaries for this purpose.

Figure 10:
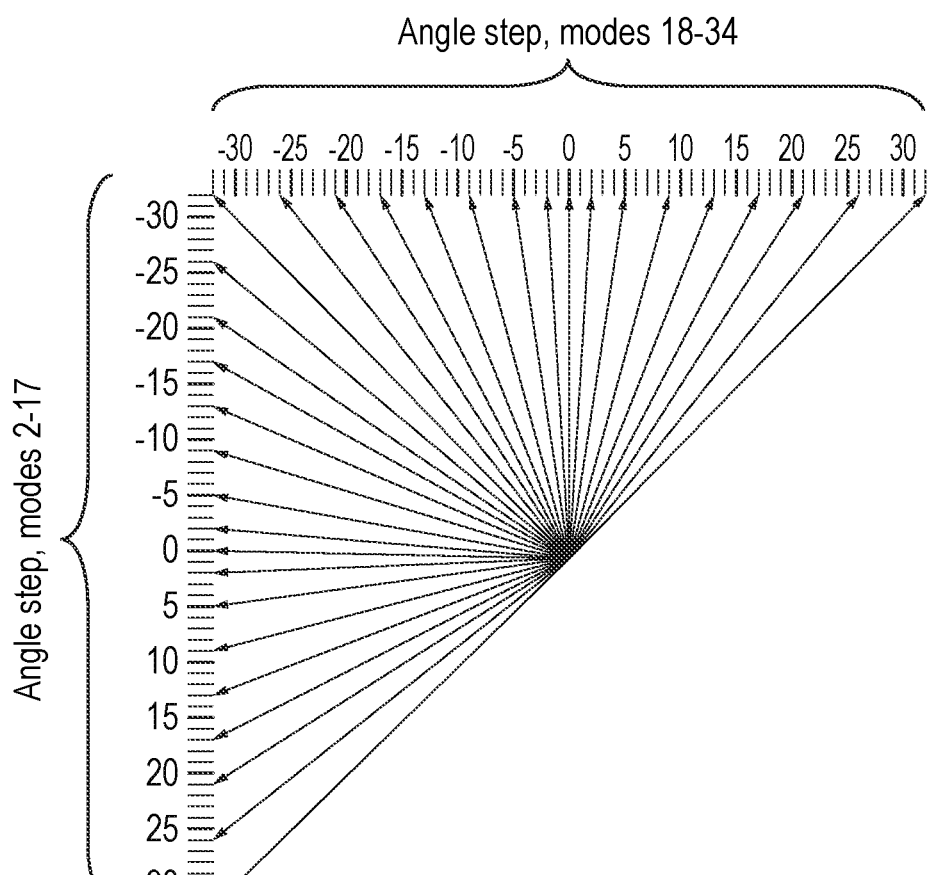
FIG. 10 schematically illustrates a set of possible intra-prediction directions.
Figure 11:
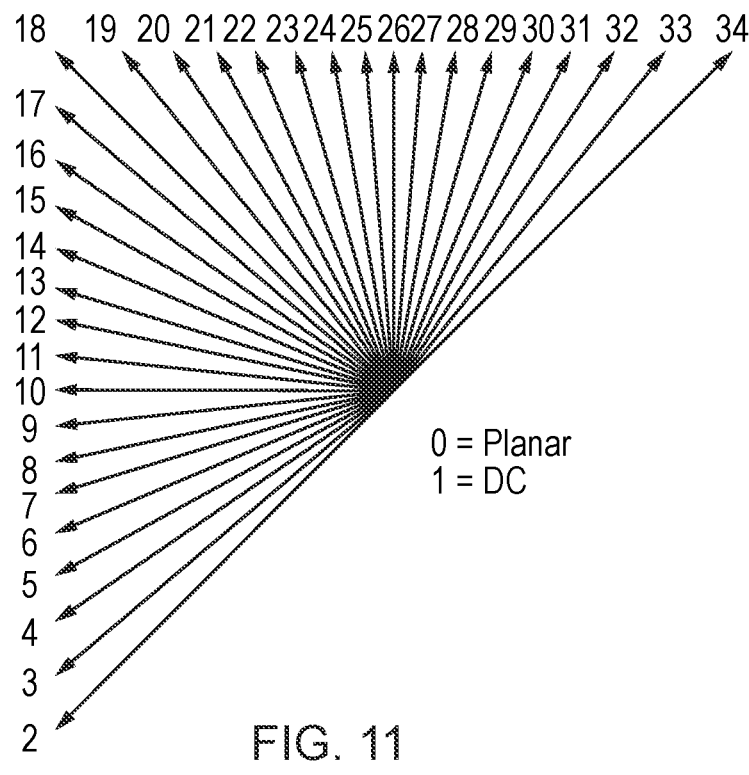
FIG. 11 schematically illustrates a set of prediction modes.

FIG. 10 schematically illustrates a set of possible (candidate) prediction directions. The full set of candidate directions is available to a prediction unit. The directions are determined by horizontal and vertical displacement relative to a current block position, but are encoded as prediction "modes", a set of which is shown in FIG. 11. Note that the so-called DC mode represents a simple arithmetic mean of the surrounding upper and left-hand samples. Note also that the set of directions shown in FIG. 10 is just one example; in other examples, a set of (for example) 65 angular modes plus DC and planar (a full set of 67 modes) as shown schematically in FIG. 12 makes up the full set. Other numbers of modes could be used.

In general terms, after detecting a prediction direction, the systems are operable to generate a predicted block of samples according to other samples defined by the prediction direction. In examples, the image encoder is configured to encode data identifying the prediction direction selected for each sample or region of the image (and the image decoder is configured to detect such data).

Figure 13:
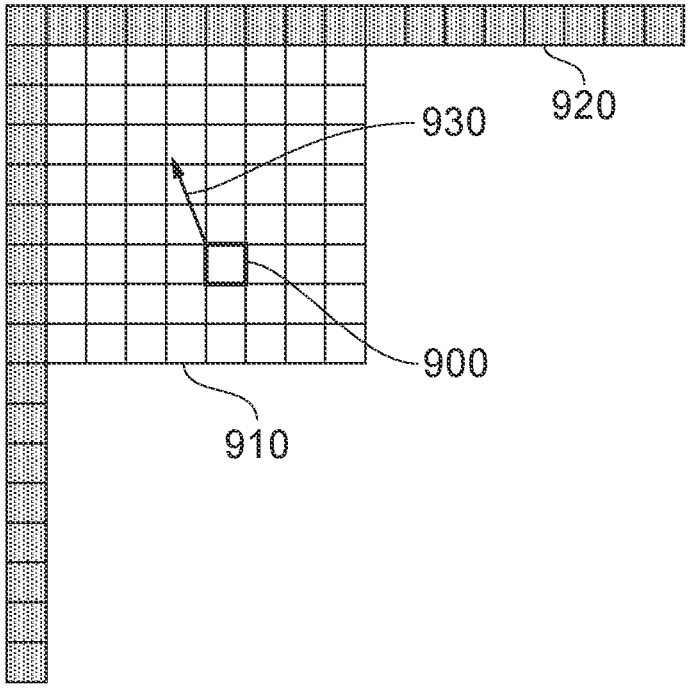
FIG. 13 schematically illustrates an intra-prediction process.

FIG. 13 schematically illustrates an intra-prediction process in which a sample 900 of a block or region 910 of samples is derived from other reference samples 920 of the same image according to a direction 930 defined by the intra-prediction mode associated with that sample. The reference samples 920 in this example come from blocks above and to the left of the block 910 in question and the predicted value of the sample 900 is obtained by tracking along the direction 930 to the reference samples 920. The direction 930 might point to a single individual reference sample but in a more general case an interpolated value between surrounding reference samples is used as the prediction value. Note that the block 910 could be square as shown in FIG. 13 or could be another shape such as rectangular.

Figure 14:
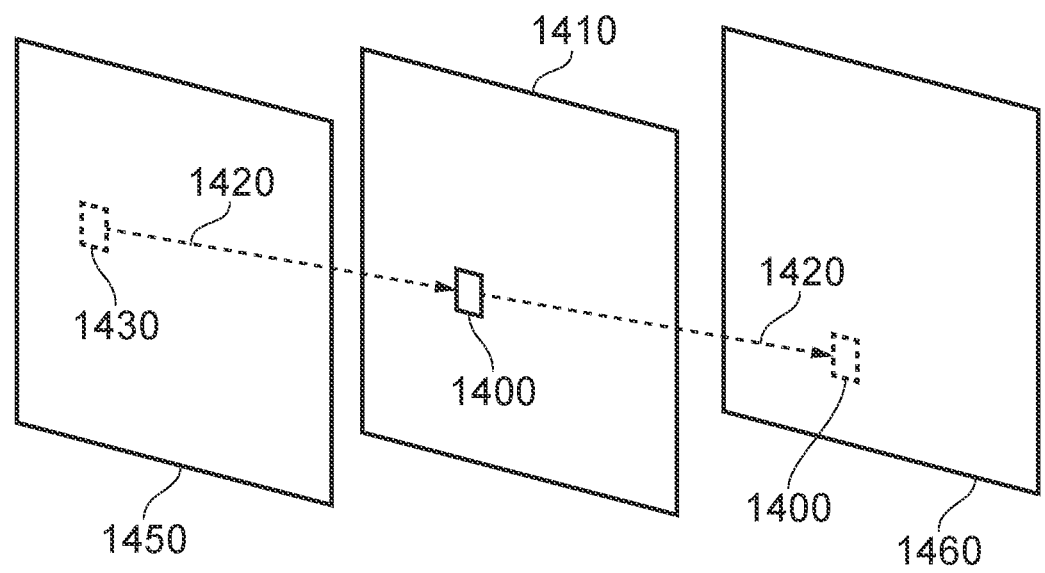
FIG. 14 schematically illustrates an inter-prediction process.

FIG. 14 schematically illustrates an inter-prediction process, in which a block or region 1400 of a current image 1410 is predicted with respect to a block 1430, 1440 or both, pointed to by a motion vector 1420 in one or more other images 1450, 1460. The predicted block can be used as discussed above in the generation of residual data which is encoded as described above.

CABAC Encoding

Figure 15:
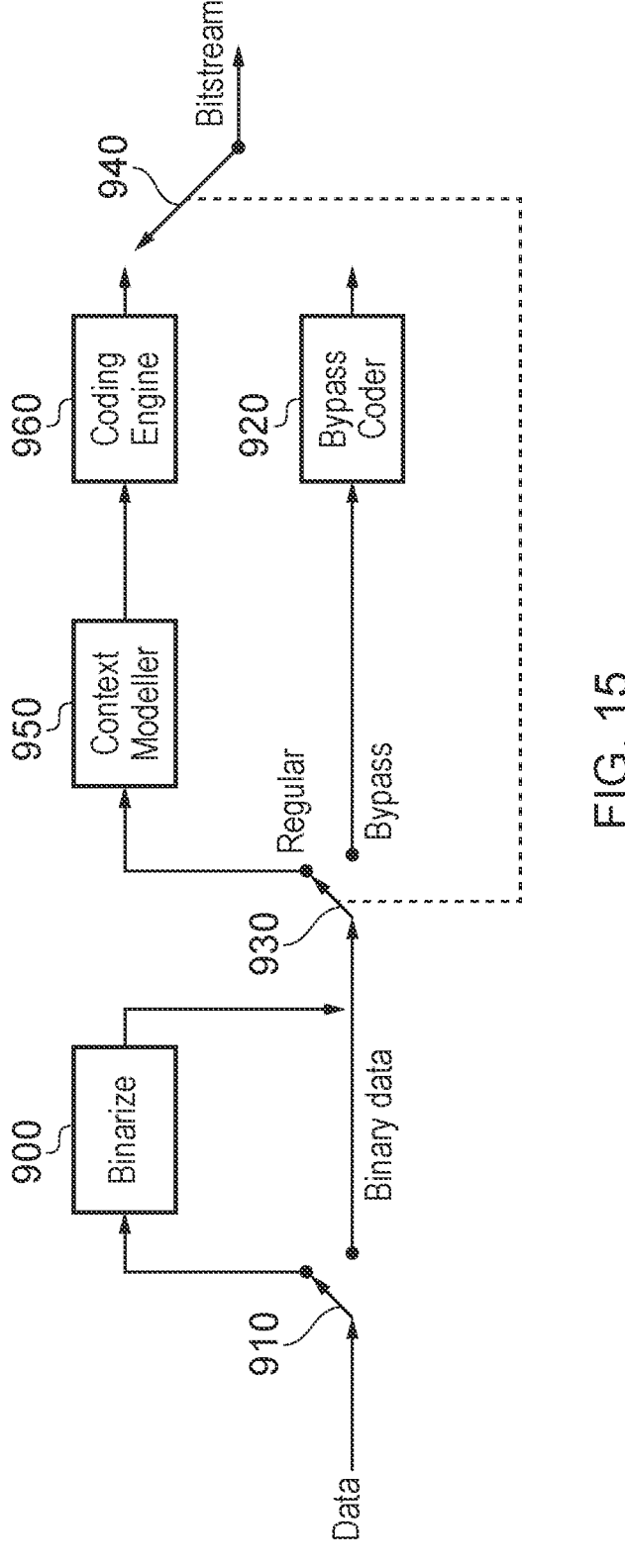
FIG. 15 schematically illustrates an example CABAC encoder.

FIG. 15 schematically illustrates the operation of a CABAC entropy encoder.

In context adaptive encoding of this nature and according to embodiments, a bit of data may be encoded with respect to a probability model, or context, representing an expectation or prediction of how likely it is that the data bit will be a one or a zero. To do this, an input data bit is assigned a code value within a selected one of two (or more generally, a plurality of) complementary sub-ranges of a range of code values, with the respective sizes of the sub-ranges (in embodiments, the respective proportions of the sub-ranges relative to the set of code values) being defined by the context (which in turn is defined by a context variable associated with or otherwise relevant to that input value). A next step is to modify the overall range, which is to say, the set of code values, (for use in respect of a next input data bit or value) in response to the assigned code value and the current size of the selected sub-range. If the modified range is then smaller than a threshold representing a predetermined minimum size (for example, one half of an original range size) then it is increased in size, for example by doubling (shifting left) the modified range, which doubling process can be carried out successively (more than once) if required, until the range has at least the predetermined minimum size. At this point, an output encoded data bit is generated to indicate that a (or each, if more than one) doubling or size-increasing operation took place. A further step is to modify the context (that is, in embodiments, to modify the context variable) for use with or in respect of the next input data bit or value (or, in some embodiments, in respect of a next group of data bits or values to be encoded). This may be carried out by using the current context and the identity of the current "most probable symbol" (either one or zero, whichever is indicated by the context to currently have a greater than 0.5 probability) as an index into a look-up table of new context values, or as inputs to an appropriate mathematical formula from which a new context variable may be derived. The modification of the context variable may, in embodiments, increase the proportion of the set of code values in the sub-range which was selected for the current data value.

The CABAC encoder operates in respect of binary data, that is to say, data represented by only the two symbols 0 and 1. The encoder makes use of a so-called context modelling process which selects a "context" or probability model for subsequent data on the basis of previously encoded data. The selection of the context is carried out in a deterministic way so that the same determination, on the basis of previously decoded data, can be performed at the decoder without the need for further data (specifying the context) to be added to the encoded datastream passed to the decoder.

Referring to FIG. 15, input data to be encoded may be passed to a binary converter 900 if it is not already in a binary form; if the data is already in binary form, the converter 900 is bypassed (by a schematic switch 910). In the present embodiments, conversion to a binary form is actually carried out by expressing the quantised transform coefficient data as a series of binary "maps", which will be described further below.

The binary data may then be handled by one of two processing paths, a "regular" and a "bypass" path (which are shown schematically as separate paths but which, in embodiments discussed below, could in fact be implemented by the same processing stages, just using slightly different parameters). The bypass path employs a so-called bypass coder 920 which does not necessarily make use of context modelling in the same form as the regular path. In some examples of CABAC coding, this bypass path can be selected if there is a need for particularly rapid processing of a batch of data, but in the present embodiments two features of so-called "bypass" data are noted: firstly, the bypass data is handled by the CABAC encoder (950, 960), just using a fixed context model representing a 50% probability; and secondly, the bypass data relates to certain categories of data, one particular example being coefficient sign data. Otherwise, the regular path is selected by schematic switches 930, 940. This involves the data being processed by a context modeller 950 followed by a coding engine 960.

The entropy encoder shown in FIG. 15 encodes a block of data (that is, for example, data corresponding to a block of coefficients relating to a block of the residual image) as a single value if the block is formed entirely of zero-valued data. For each block that does not fall into this category, that is to say a block that contains at least some non-zero data, a "significance map" is prepared. The significance map indicates whether, for each position in a block of data to be encoded, the corresponding coefficient in the block is non-zero (and so is an example of a significance map indicative of positions, relative to an array of the data values, of most-significant data portions which are non-zero.) The significance map may comprise a data flag indicative of the position, according to a predetermined ordering of the array of data values, of the last of the most-significant data portions having a non-zero value. The ordering of the array of data values for this encoding can be in an order from the lowest frequency coefficient upwards in spatial frequency, for example. This may differ from an array order for encoding of the data value signs, which may be in an order from a highest spatial frequency coefficient downwards, for example starting from the last (in the upward spatial frequency order) non-zero coefficient.

The significance map data, being in binary form, is itself CABAC encoded. The use of the significance map assists with compression because no data needs to be encoded for a coefficient with a magnitude that the significance map indicates to be zero. Also, the significance map can include a special code to indicate the final non-zero coefficient in the block, so that all of the final high frequency/trailing zero coefficients can be omitted from the encoding. The significance map is followed, in the encoded bitstream, by data defining the values of the non-zero coefficients specified by the significance map.

Further levels of map data are also prepared and are CABAC encoded. An example is a map which defines, as a binary value (1=yes, 0=no) whether the coefficient data at a map position which the significance map has indicated to be "non-zero" actually has the value of "one". Another map specifies whether the coefficient data at a map position which the significance map has indicated to be "non-zero" actually has the value of "two". A further map indicates, for those map positions where the significance map has indicated that the coefficient data is "non-zero", whether the data has a value of "greater than two". Another map indicates, again for data identified as "non-zero", the sign of the data value (using a predetermined binary notation such as 1 for +, 0 for −, or of course the other way around).

In embodiments, the significance map and other maps are generated from the quantised transform coefficients, for example by the scan unit 360, and is subjected to a zigzag scanning process (or a scanning process selected from zigzag, horizontal raster and vertical raster scanning according to the intra-prediction mode) before being subjected to CABAC encoding.

In some embodiments, the CABAC entropy coder codes syntax elements using the following processes:

The location of the last significant coefficient (in scan order) in the TU is coded.

For each 4×4 coefficient group (groups are processed in reverse scan order), a significant-coefficient-group flag is coded, indicating whether or not the group contains non-zero coefficients. This is not required for the group containing the last significant coefficient and is assumed to be 1 for the top-left group (containing the DC coefficient). If the flag is 1, then the following syntax elements pertaining to the group are coded immediately following it:

Significance Map:

For each coefficient in the group, a flag is coded indicating whether or not the coefficient is significant (has a non-zero value). No flag is necessary for the coefficient indicated by the last-significant position.

Greater-than-One Map:

For up to eight coefficients with significance map value 1 (counted backwards from the end of the group), this indicates whether the magnitude is greater than 1.

Greater-than-Two Flag:

For up to one coefficient with greater-than-one map value 1 (the one nearest the end of the group), this indicates whether the magnitude is greater than 2.

Sign Bits:

In previously proposed arrangements, sign bits are coded as equiprobable CABAC bins, with the last sign bit (in reverse scan order) possibly being instead inferred from parity when sign bit hiding is used. Alternatives to this arrangement, applicable to embodiments of the present disclosure, will be discussed below.

Escape Codes:

For any coefficient whose magnitude was not completely described by an earlier syntax element, the remainder is coded as an escape code.

In general terms, CABAC encoding involves predicting a context, or a probability model, for a next bit to be encoded, based upon other previously encoded data. If the next bit is the same as the bit identified as "most likely" by the probability model, then the encoding of the information that "the next bit agrees with the probability model" can be encoded with great efficiency. It is less efficient to encode that "the next bit does not agree with the probability model", so the derivation of the context data is important to good operation of the encoder. The term "adaptive" means that the context or probability models are adapted, or varied during encoding, in an attempt to provide a good match to the (as yet uncoded) next data.

Using a simple analogy, in the written English language, the letter "U" is relatively uncommon. But in a letter position immediately after the letter "Q", it is very common indeed. So, a probability model might set the probability of a "U" as a very low value, but if the current letter is a "Q", the probability model for a "U" as the next letter could be set to a very high probability value.

CABAC encoding is used, in the present arrangements, for at least the significance map and the maps indicating whether the non-zero values are one or two, though each of these syntax elements may not be coded for every coefficient. Bypass processing—which in these embodiments is identical to CABAC encoding but for the fact that the probability model is fixed at an equal (0.5:0.5) probability distribution of 1s and 0s, is used for at least the sign data and the parts of the coefficient magnitude that have not been described by an earlier syntax element. For those data positions identified as having parts of their coefficient magnitude not fully described, a separate so-called escape data encoding can be used to encode the actual remaining value of the data, where the actual magnitude value is the remaining magnitude value plus an offset derived from the respective coded syntax elements. This may include a Golomb-Rice encoding technique.

The CABAC context modelling and encoding process is described in more detail in SERIES H: AUDIOVISUAL AND MULTIMEDIA SYSTEMS Infrastructure of audiovisual services—Coding of moving video High efficiency video coding Recommendation ITU-T H.265 December 2016. Also: High Efficiency Video Coding (HECV) algorithms and Architectures, Editors: Madhukar Budagavi, Gary J. Sullivan, Vivienne Sze; ISBN 978-3-319-06894-7; 2014 Chap 8 p 209-274 which is incorporated herein in its entirety by reference.

Sign Bit Encoding

In example embodiments to be discussed below, the sign bits can be encoded other than by equiprobable encoding, for example by predicting, for a set of data values comprising at least some of the data values, the respective data value sign from a property of one or more other data values in the ordered array; and encoding the data value sign for the set of data values in dependence upon the respective predicted value.

In order to achieve this, a prediction of at least one or more of the sign bits is used. In obtaining this prediction, it is noted that although the data values represented in part by the sign bits comprise apparently independent data values (being, for example, spatial frequency coefficients), there can be at least a partial dependency between the data value signs. The origin and empirical observation of this dependency, which contribute to the design and operation of embodiments of the present disclosure, will be discussed below.

It is noted that in order to achieve an improved encoding efficiency, it is not in fact necessary to be able to predict with complete certainty that a particular sign bit will definitely be a bit representing a negative sign, or will definitely be a bit representing a positive sign. In fact, using for example a context-adaptive encoder or a similar type of arrangement which takes into account a probability of a next symbol to be encoded, all that is needed is the ability to predict that a particular sign bit is (even slightly) more likely than an even (50%) chance to be a bit representing a negative sign, or is (even slightly) more likely than an even chance to be a bit representing a positive sign. Such a prediction can be used, for example in a context adaptive encoder such as that shown in FIG. 15, to select an appropriate context for encoding of the next sign bit.

The technical background to sign bit prediction will now be described. An example relating to DCT encoding will be used first, but in further discussion below, the techniques will be extended to other arrangements such as the discrete sine transform (DST), a so-called transform-skip mode and a so-called non-separable secondary transform (NSST) mode.

Non-separable secondary transforms (NSST) are discussed in "Algorithm Description of Joint Exploration Test Model 1", Chen et al, Joint Video Exploration Team (JVET) document JVET-A1001. In this document, an NSST is disclosed which represents a secondary transform applied between a forward core transform and quantization (at the encoder side) and between de-quantization and an inverse core transform (at the decoder side). The contents of this document are hereby incorporated by reference into the present description.

Accordingly, in example arrangements the ordered array of data values comprises data values of a frequency transformed representation of the residual image region. The frequency transform may comprise for example a discrete cosine transform (DCT); a discrete sine transform (DST); a DCT in one direction and a DST in an orthogonal direction; and a first transform followed by a non-separable secondary transform. In other examples, the ordered array of data values may comprise data values of a reordered representation of the residual image region in a transform skip mode.

Transform skip operation is discussed section 8.6.2 of The CABAC context modelling and encoding process is described in more detail in SERIES H: AUDIOVISUAL AND MULTIMEDIA SYSTEMS Infrastructure of audiovisual services—Coding of moving video High efficiency video coding Recommendation ITU-T H.265 December 2016. Also: High Efficiency Video Coding (HECV) algorithms and Architectures, Editors: Madhukar Budagavi, Gary J. Sullivan, Vivienne Sze; ISBN 978-3-319-06894-7; 2014 Chap 8 p 209-274 which is incorporated herein in its entirety by reference. For some regions or blocks, coding gains can be achieved by skipping the transform. The residual in the spatial domain is quantised and encoded, in some instances in a reverse spatial order (to align the expected magnitude of spatial differences, greatest in the lower right of the block furthest away from the reference samples, with the expected order of coefficient magnitude in a frequency transformed block (generally greatest at the top left of DC coefficient).

For intra predicted data, in a residual block, generally speaking the nearer that a residual sample is to its respective reference sample(s), the lower the error or residual value magnitude is expected to be. (In contrast, for inter predicted data the error tends to be more uniformly distributed across the block). In the representations used here and often used in other discussions of the present techniques, the residual samples to the top and left of a residual block will tend to have a lower error than those on the bottom and/or right of the residual block. Indeed, this is partly the reason why the so-called "short distance intra predict" (SDIP) arrangement was proposed.

Short distance Intra Prediction (SDIP) is discussed in CE6.b1 Report on Short Distance Intra Prediction Method, Cao et al, Joint Collaborative Team on Video Coding (JCT-VC) document: JCTVC-E278. In SDIP a larger block is partitioned into so-called SDIP partitions which can be separately encoded. The contents of this document are hereby incorporated by reference into the present description.

Figures 16, 17, 18, 19:
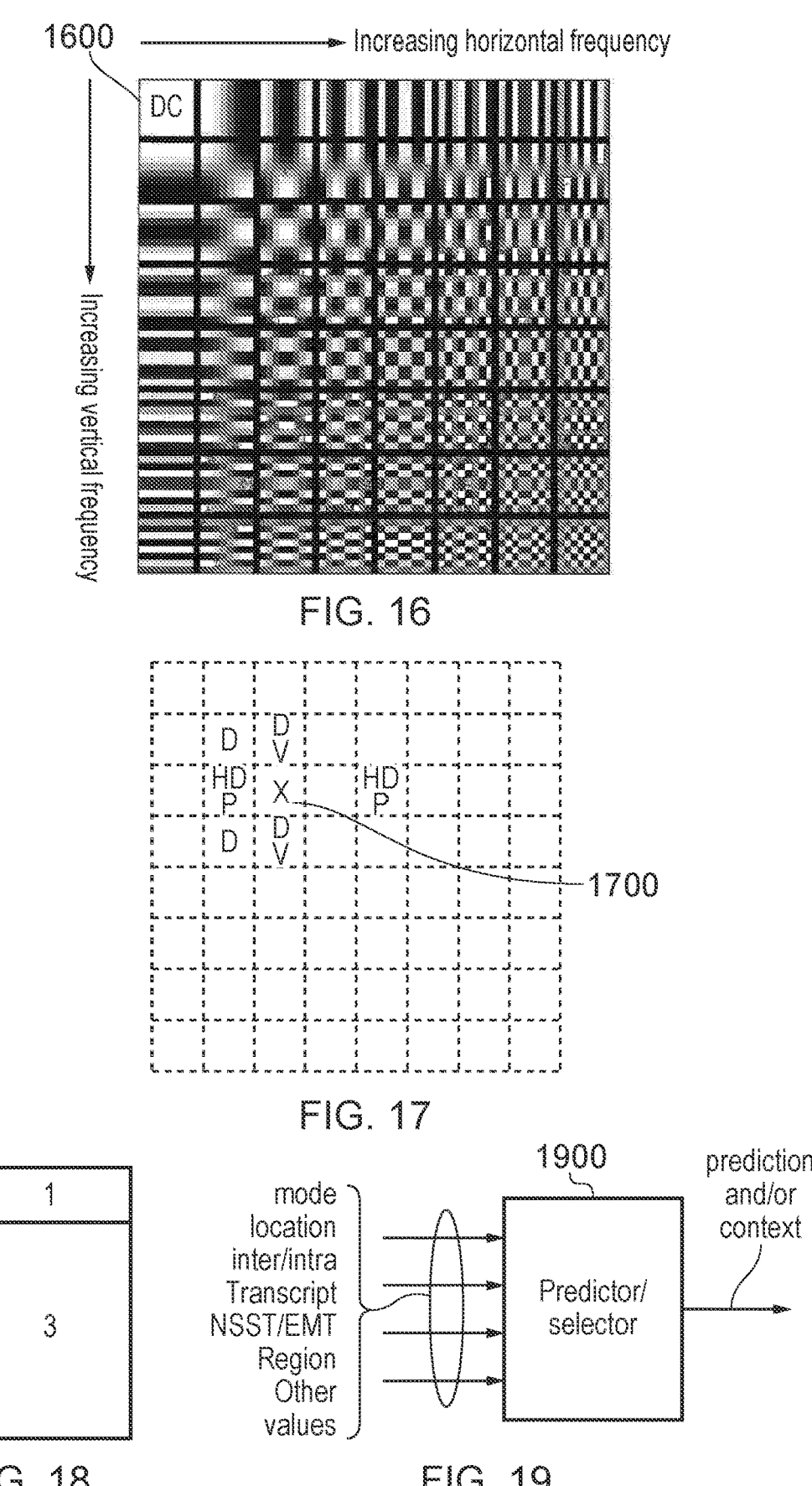
FIG. 16 schematically illustrates an array of data values.
FIG. 17 schematically illustrates example sign bit dependencies.
FIG. 18 schematically illustrates array regions.
FIG. 19 schematically illustrates a predictor/selector.

However, considering the implications in the frequency domain in a DCT example, FIG. 16 schematically illustrates a set of DCT basis functions for an 8×8 example block from a DC coefficient in the top left, towards increasing horizontal spatial frequency in a rightwards direction and increasing vertical spatial frequency in a downwards direction.

Taking the horizontal direction for example, if the energy in the residual block is low to the left of the block then the DCT coefficient 1600 (a coefficient (0, 0) is likely to have the opposite sign to that of the next horizontally adjacent coefficient (0, 1) 1610. In other words:

Probability that sign $(c_{0,0})$ is the same as sign $(c_{0,1})$<0.5

This is just one example of one pair of coefficient positions. In fact, empirical studies using a large set of test data have indicated that there can be correlations (which is to say, positive or negative correlations) between sign bits, between multiple sets of locations within a DCT block.

Figure 12:
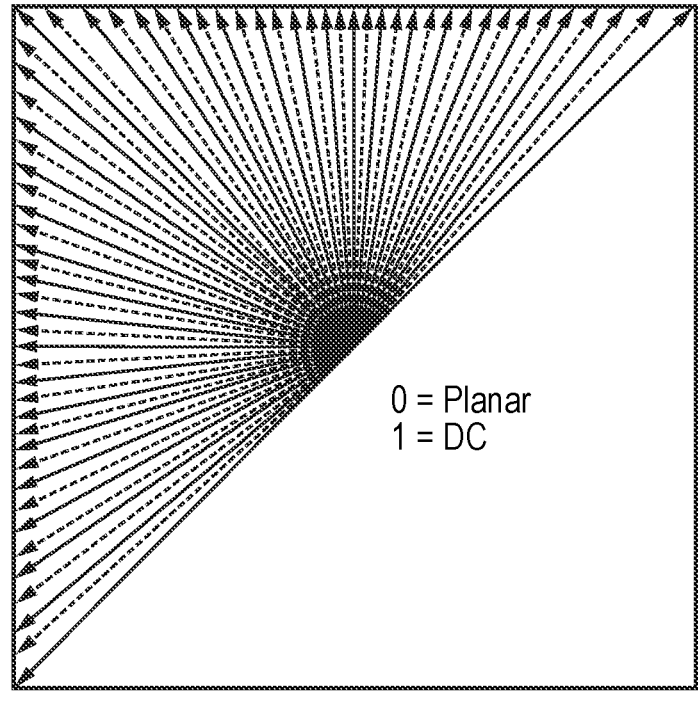
FIG. 12 schematically illustrates another set of prediction modes.

Inter encoding will be discussed below. Where intra encoding has been used to generate the prediction from which the residual block is obtained, the nature of these correlations can depend upon the prediction mode or direction used. FIGS. 10-12 above discussed example sets of prediction modes, and in the following discussion, the example set of FIG. 11 will be referred to, although the principles can apply whichever set is used. Therefore, in examples, the step of predicting an image region for an image to be encoded comprises predicting samples of the image region in dependence upon other previously encoded and decoded samples of the image, displaced from the predicted samples in a direction defined by a prediction mode.

Consider the example of a generally vertical prediction mode (such as the mode 25 or 25+/−a margin such as 4). Here, the dependencies between sign bits can tend to act in a generally (though not necessarily exclusively) vertical sense. Referring to FIG. 17, the example of just one location in the block (a location 1700, marked "X") is used, though it will be appreciated that similar principles at least potentially apply to any or all locations within the block. For vertical modes, the sign bits considered to be most correlated with the sign of the location X are shown as locations 1710, marked as "V".

Next consider the example of a generally horizontal prediction mode (such as the mode 10 or 10+/–a margin such as 4). Here, the dependencies between sign bits can tend to act in a generally (though not necessarily exclusively) horizontal sense. Referring again to FIG. 17, for horizontal modes, the sign bits considered to be most correlated with the sign of the location X are shown as locations 1720, marked as "H".

Next consider the example of a generally diagonal prediction mode (such as the mode 18 or 18+/–a margin such as 4, or the mode 2+a margin, or the mode 34–a margin). Here, the dependencies between sign bits can tend to act in a generally (though not necessarily exclusively) diagonal or mixed horizontal and vertical sense. Referring again to FIG. 17, for diagonal modes, the sign bits considered to be most correlated with the sign of the location X are shown as locations 1730, marked as "D".

Next consider the example of a DC or planar prediction mode (such as the mode 0 or 1). Referring again to FIG. 17, for DC or planar modes, the sign bits considered to be most correlated with the sign of the location X are shown as locations 1740, marked as "P".

Therefore, for each data value of the set of data values, the relative positions of the one or more other data values from which that data value is predicted can depend upon the prediction mode applicable to the array of data values.

In the encoding of blocks using this technique, it can be useful to generate a prediction for a particular sign bit in response to previously encoded sign bits. This makes it possible to perform complementary processes at the encoder and decoder, so that a corresponding prediction can be made at the decoder on the basis of already-decoded sign bits.

The techniques are applicable to DST, transform skip and inter-encoded images as well as to the example of DCT encoded intra images discussed here. The look-ups may be different as between these different arrangements, but the underlying technique is equally applicable. Non-separable secondary transforms (NSST) or enhanced multiple transforms (EMT) may be used. One transform (such as DCT or DST) could be used in one axis (such as horizontal or vertical) and another transform (such as DST or DCT) could be used in the other orthogonal direction.

For inter coded blocks, different correlations may be observed and will be discussed below. The block of FIG. 16 provides an example in which the ordered array of data values comprises data values of a frequency transformed representation of the residual image region in which the residual image region has been subjected to a series of one or more frequency transformations (such as a transform and an NSST). For example, the frequency transform comprises one or more of: a discrete cosine transform (DCT); a discrete sine transform (DST); a DCT in one direction and a DST in an orthogonal direction; and a first transform followed by a non-separable secondary transform. Alternatively the ordered array of data values may comprise data values of a reordered representation of the residual image region in a transform skip mode.

Example ways in which these correlations can be utilised will be discussed below.

With reference to FIG. 18, the sign prediction process can be carried out using different sets of coefficients, or even different algorithms, for different regions of a block to be encoded. Examples shown in FIG. 18 are:

a region 0, the top-left (DC) coefficient;

a region 1, the top row;

a region 2, the left column; and a region 3, all other locations

These groupings can affect the relative location of the sample or samples from which the sign is predicted, in that for each data value of the set of data values, the relative positions of the one or more other data values from which that data value is predicted depend upon the position within the array of data values of the data value to be predicted. Therefore, in examples, for each data value of the set of data values, the relative positions of the one or more other data values from which that data value is predicted may depend upon the position within the array of data values of the data value to be predicted.

FIG. 19 schematically illustrates a predictor/selector unit 1900 which receives as inputs one or more of:

a currently applicable prediction mode a coefficient location within the current block an indication of whether the current block is inter-encoded or intra-predicted an indication of whether the current block is DCT encoded, DST encoded, DCT coded in one direction and DST coded in the orthogonal direction, or transform-skip encoded signs represented by other previously encoded sign bits These inputs are applied to a look-up table, for example, so that as a result the predictor/selector unit 1900 generates as an output 1910 one or both of:

a prediction of the current sign bit; and/or a context to be used in encoding (or in the case of a decoder, decoding) the current sign bit Note that the look-up can also refer to other data, so that in some examples for each data value of the set of data values, the property of the one or more other data values from which that data value is predicted depend upon one or more selected from the list consisting of:

the prediction mode applicable to the array of data values;

the array size of the array of data values;

the shape of the array of data values; and a location of that data value within the array of data values Note that the embodiments are not restricted to arrangements in which the property of one or more other data values (on which a prediction/context selection is based) comprises the sign of the one or more other data values. In other examples, the property of the one or more other data values could instead or additionally comprise the magnitude of the one or more other data values.

Figure 20A:
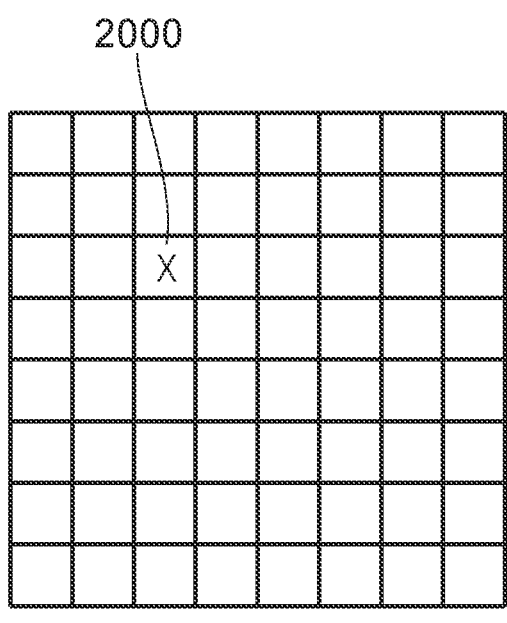
FIGS. 20a and 20b schematically illustrate a set of relative positions.
Figure 20B:
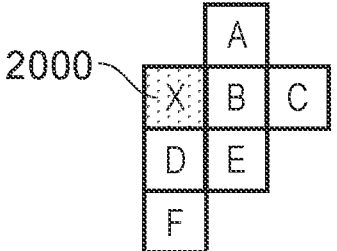

FIGS. 20a and 20b schematically illustrate another example, in which, for a particular arbitrary location X such as a location 2000 in a block, the sign applicable to that location is predicted (or a context for encoding that sign bit is generated) as a look-up function of the signs of a set of other nearby previously encoded (or at the decoder, previously decoded) sign bits A . . . F at respective relative locations, where those locations actually exist in the already-encoded or already-decoded data relative to the location X.

For each data value of the set of data values, the one or more other data values from which that data value is predicted are at predetermined relative positions to that data value in the array of data values. FIG. 20b provides an example of this.

For inter coded blocks, different correlations may be observed:

example, using FIG. 15) in which the context depends upon the predicted data value sign (as obtained by the apparatus

```
For DCTxDCT sign bit inter prediction:
    Neighbourhood around current coefficient X (and position x,y)
    See the pattern including a data value X to be predicted in FIG. 20b:.
            (A)
    X       B       C
    D       E
    F
For transformSkip blocks (potentially either intra or inter coded),
    If (B<0 and D<0) or (B>0 and D>0)
        Predicted sign = same as B (or D).
    Else if (B!=0 and D==0)
        Predicted sign = same as B.
    Else if (B==0 and D!=0)
        Predicted sign = same as D.
    Else if (B!=0 and D!=0 and E!=0)
        Predicted sign = opposite of E.
    Else
        Don't predicted sign - use equiprobable bin.
For inter transformed blocks
    Let
        Right=(DCT horizontally) ? C : 0
        Below=(DCT vertically) ? F : 0
            (in other words, if a DST transform is applied in a particular direction, assume no
    correlation with the sign bit, and therefore treat as if the coefficient did not exist)
    if (Right<0 and Below <0) || (Right >0 and Below >0) (where the symbol || signifies a logical
OR operation)
        Predicted sign = opposite sign to Right (or Below - they're the same)
    else if (Right!=0 and Below ==0) (where != signifies not equals)
        Predicted sign = opposite sign to Right
    else if (Below!=0 and Right ==0)
        Predicted sign = opposite sign to Below
    else if (Right!=0 and Below!=0)
        if (abs(Right)>abs(Below))
            Predicted sign = opposite sign to Right.
        else
            Predicted sign = opposite sign to Below.
    else
        If (y==0 and (x AND 1)!=0 && (x*2>=width) and DCT horizontally) (where && signifies a
logical operation which returns the Boolean value true if both operands are true and returns
false otherwise, and the logical AND operation serves to detect positions x=5 or 7, y=0 of an
8x8 block)
            Predicted sign = negative sign.
        Else if (x==0 and (y AND 1)!=0 && (y*2>=height) and DCT vertically)
            Predicted sign = negative sign.
        Else
            Don't predict sign: use equiprobable bin instead.
```

In at least some example embodiments, the different predictions made in the above may have different probability models (i.e. use different contexts) associated with them depending on the match.

For example, if Right and Below have the same sign, the probability of a good prediction is often better than if just right or just below existed. Hence different CABAC contexts could be used for different conditions. In embodiments the CABAC context used could also depend on location (for example DC), or chroma/luma component.

Figure 21:
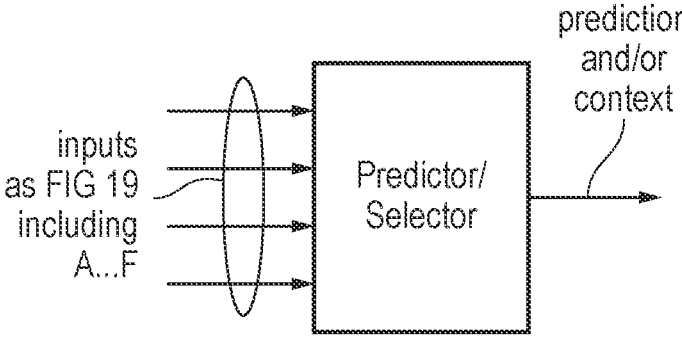
FIG. 21 schematically illustrates a predictor/selector.

FIG. 21 schematically illustrates a predictor/context selector unit 2100 similar in many respects to that of FIG. 19, but in which the inputs (in terms of other previously encoded/decoded sign bits where they exist) comprise those at the relative locations A . . . F with respect to the current sign bit under consideration. The output can be a prediction of the current sign bit or instead (or as well) a context for use in context-adaptive encoding of the current sign bit by the apparatus of FIG. 15. In the example of the samples A . . . F, for each data value of the set of data values, the one or more other data values from which that data value is predicted are at predetermined relative positions to that data value in the array of data values.

In such embodiments, encoding the data value sign can comprise performing context adaptive encoding (for example, using FIG. 15) in which the context depends upon the predicted data value sign (as obtained by the apparatus of FIG. 21). Similarly, at decoding, the arrangement of FIG. 21 can derive a context for use by the entropy decoder 410, complementary to the apparatus of FIG. 15, so that decoding the data value sign comprises performing context adaptive decoding in which the context depends upon the predicted data value sign.

The inputs to FIG. 21 or to FIG. 19 can be for example other data value signs so that the property of one or more other data values comprises the sign of the one or more other data values. In other examples the property of one or more other data values comprises the magnitude of the one or more other data values.

Figures 22, 23:
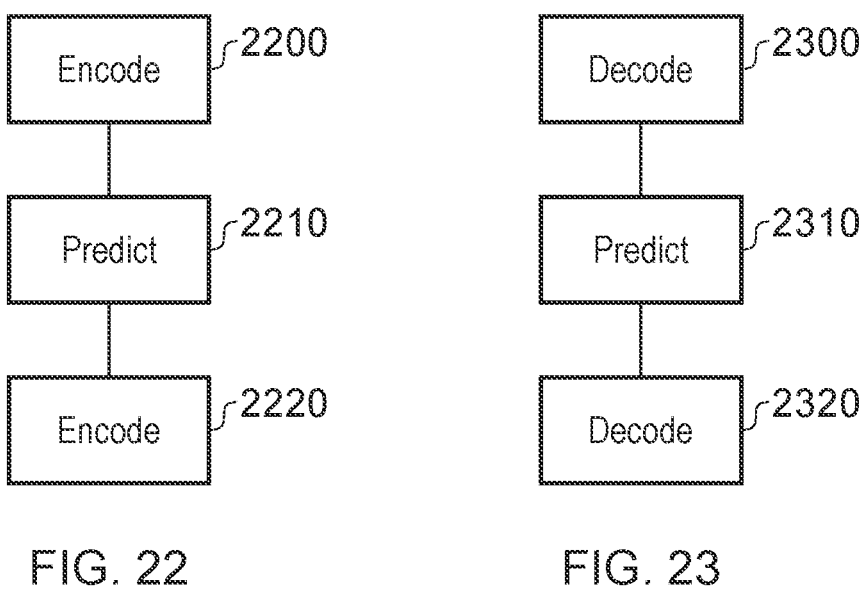
FIGS. 22 and 23 are schematic flowcharts illustrating respective methods.

As a summary of the information discussed so far, FIG. 22 is a schematic flowchart illustrating a data encoding method comprising:

encoding (at a step 2200) an ordered array of data values as data representing a data value magnitude and data representing a data value sign;

predicting (at a step 2210), for a set of data values comprising at least some of the data values, the respective data value sign from a property of one or more other data values in the ordered array; and encoding (at a step 2220) the data value sign for the set of data values in dependence upon the respective predicted value.

Similarly, FIG. 23 is a schematic flowchart illustrating a data decoding method comprising:

decoding (at a step 2300) an ordered array of data values as data representing a data value magnitude and data representing a data value sign;

predicting (at a step 2310), for a set of data values comprising at least some of the data values, the respective data value sign from a property of one or more other data values in the ordered array; and decoding (at a step 2320) the data value sign for the set of data values in dependence upon the respective predicted value.

Figure 24:
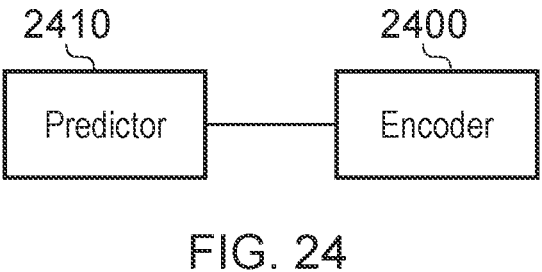
FIG. 24 schematically illustrates a data encoding apparatus.
Figure 25:
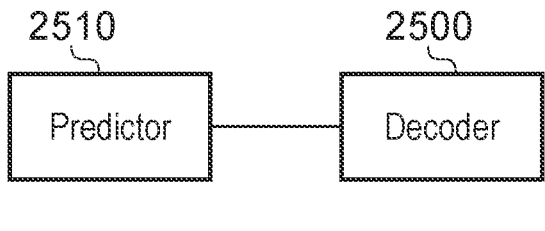
FIG. 25 schematically illustrates a data decoding apparatus.

FIG. 24 schematically illustrates at least a part of a data encoding apparatus comprising:

an encoder 2400, for example comprising the units 360, 370 of FIG. 7, configured to encoding an ordered array of data values as data representing a data value magnitude and data representing a data value sign; and a predictor 2410, for example implemented by the unit 370 in cooperation with the unit 343, configured to predict, for a set of data values comprising at least some of the data values, the respective data value sign from a property of one or more other data values in the ordered array;

the encoder being configured to encode the data value sign for the set of data values in dependence upon the respective predicted value.

FIG. 24 schematically illustrates at least a part of a data decoding apparatus comprising:

a decoder 2500, for example comprising the units 410, 400 of FIG. 7 configured to encoding an ordered array of data values as data representing a data value magnitude and data representing a data value sign; and a predictor 2510, for example implemented by the unit 410 in cooperation with the unit 343, configured to predict, for a set of data values comprising at least some of the data values, the respective data value sign from a property of one or more other data values in the ordered array;

the decoder being configured to encode the data value sign for the set of data values in dependence upon the respective predicted value.

Either or both of the encoding apparatus and the decoding apparatus can be implemented as at least a part of video storage, capture, transmission or reception apparatus as discussed above.

Figure 26:
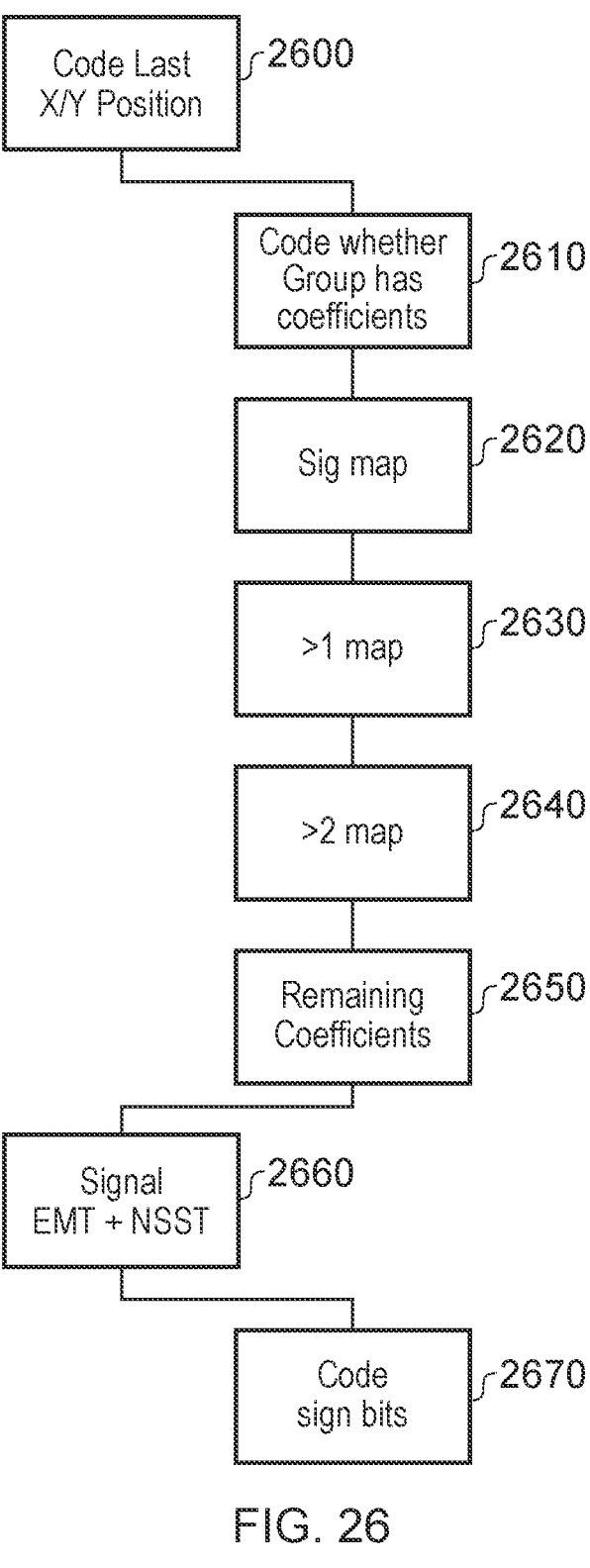
FIGS. 26 and 27 are schematic flowcharts illustrating respective methods.
Figures 27, 28:
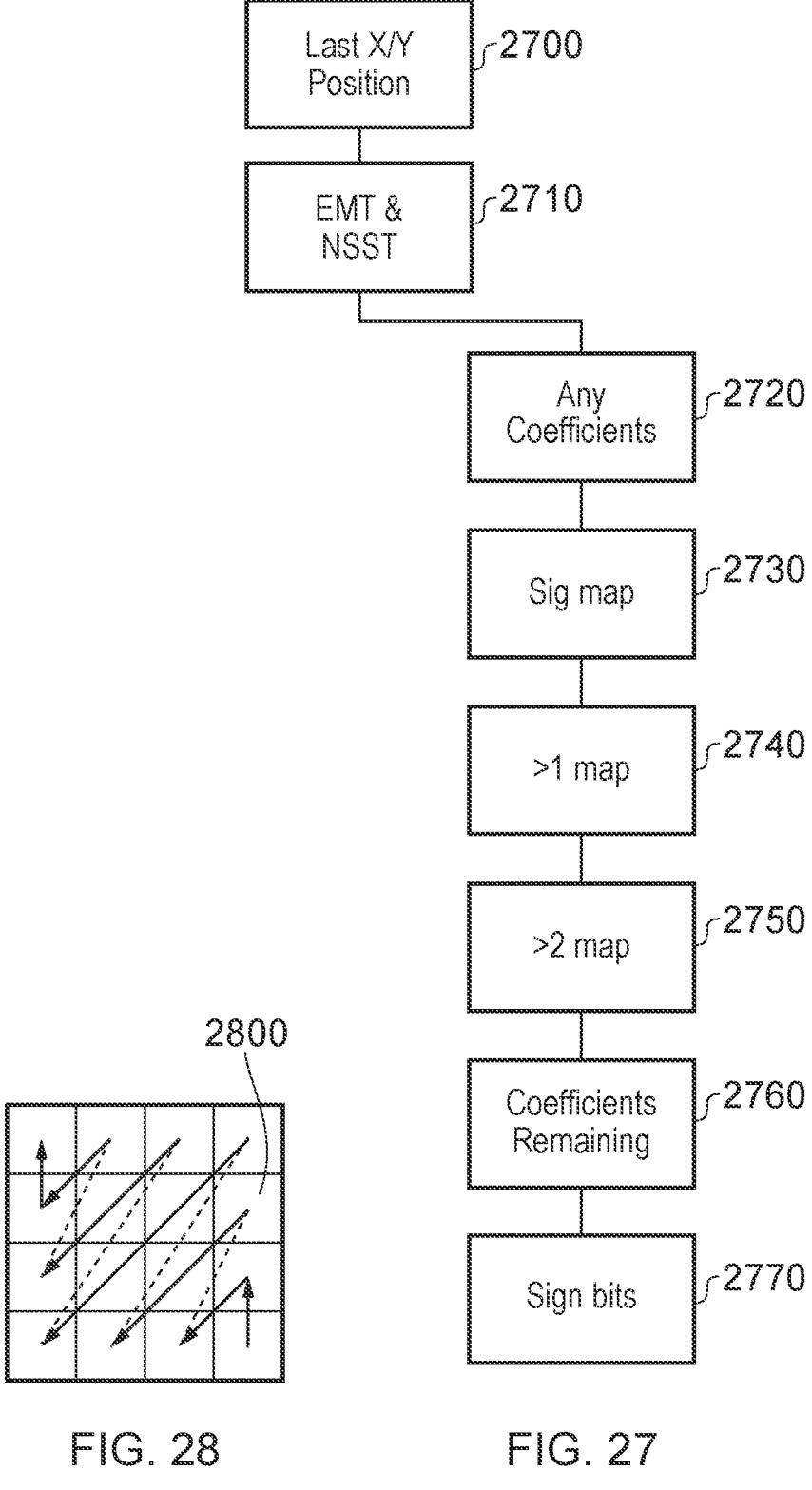
FIG. 28 schematically illustrates an example array order.

An example of a coding order was provided above. Two other examples will now be described with reference to FIGS. 26 and 27. In FIGS. 26 and 27, a left column signifies actions taken for a transform unit, and a right hand column signifies actions taken for a 4×4 or other group of 16 (or another subdivision) of coefficients within that transform unit, each being handled in turn, for example in a reverse diagonal scanning order of 16 coefficient groups.

Examples of Coding Order

Referring to FIG. 26, for a transform unit the following steps can be carried out:

Code last X/Y position (at a step 2600)—the X/Y position of the coefficient that has the highest scan order position (the highest frequency coefficient)

For each group of 16 coefficients, starting at the last coefficient group which contains the last X/Y position Code (at a step 2610) whether the group has any coefficients (unless this is inferred by some other method)

Code (at a step 2620) the significance map

Code (at a step 2630) the >1 map

Code (at a step 2640) the >2 map

Code (at a step 2650) the coefficient remaining.

If the number of coefficients in the group exceed a limit, signal (if needed) EMT+NSST flags (at a step 2660)

For each group of 16 coefficients . . .

Code (at a step 2670) sign bits.

Referring to FIG. 27, in an alternative example arrangement, for a transform unit the following steps can be carried out:

Code (at a step 2700) last X/Y position—the X/Y position of the coefficient that has the highest scan order position (the highest frequency coefficient)

If last X/Y position (as a scan order index) exceeds a limit, signal (if needed) EMT+NSST flags (at a step 2710)

For each group of 16 coefficients, starting at the last coefficient group which contains the last X/Y position Code (at a step 2720) whether the group has any coefficients (unless this is inferred by some other method)

Code (at a step 2730) the significance map

Code (at a step 2740) the >1 map

Code (at a step 2750) the >2 map

Code (at a step 2760) the coefficient remaining.

Code (at a step 2770) the sign bits

Steganography and Sign Bit Hiding

This term refers to hiding data within other data, and in the present context is a referral to a technique known as sign bit hiding (SBH), a version of which can be applied to the present techniques.

Sign bit hiding is a technique used to save the cost of sending one sign bit in each block, by (in effect) hiding one sign bit of a non-zero coefficient within a group of other coefficients. This is achieved by the encoder artificially setting the parity (whether the sum is even or odd) of the group of coefficients to a desired value, so that the parity itself indicates the hidden sign bit. This is achieved by slightly distorting one of the coefficient values, hopefully in such a way that the increased noise that this causes is less significant than the net gain of not having to transmit one sign bit.

Previously proposed SBH techniques apply this to the DC coefficient or to the last coefficient to be encoded in an encoding or array order (discussed below).

In the present example techniques, SBH or steganographic encoding is applied to the first sign bit to be encoded in the array order. This is because the prediction of sign bits discussed above relies upon previously encoded and decoded sign bits, so a more significant gain can be achieved by the use of SBH on the first sign bit to be decoded, so that other predictions can be built on that sign bit.

The array processing order for sign encoding may be a reverse diagonal scan order such as that shown schematically in FIG. 28. The first sign bit to be encoded is the sign bit of the coefficient at the "last X/Y position" in the current group of 16 coefficients, such as a coefficient 2800 in FIG. 28. the "last X/Y position" is derived with respect to an order from the top left of the block but the encoding and decoding proceeds in the array order of FIG. 28.

Therefore in these examples the method discussed above can comprise performing the predicting and encoding steps for data values of the array according to an array processing order such as the reverse diagonal scan order of FIG. 28. In some examples, the method comprises steganographically encoding the data value sign for a first data value in the array processing order (such as the "last X/Y position" but in the reverse diagonal order of FIG. 28), amongst the data representing data value magnitudes.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments. Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Respective aspects and features are defined by the following numbered clauses:

1. A data encoding method comprising:
   encoding an ordered array of data values as data representing a data value magnitude and data representing a data value sign;
   predicting, for a set of data values comprising at least some of the data values, the respective data value sign from a property of one or more other data values in the ordered array; and
   encoding the data value sign for the set of data values in dependence upon the respective predicted value.

2. A method according to clause 1, in which the step of encoding the data value sign comprises performing context adaptive encoding in which the context depends upon the predicted data value sign.

3. A method according to clause 1 or clause 2, in which the property of one or more other data values comprises the sign of the one or more other data values.

4. A method according to any one of the preceding clauses, in which the property of one or more other data values comprises the magnitude of the one or more other data values.

5. A method according to any one of the preceding clauses, in which, for each data value of the set of data values, the one or more other data values from which that data value is predicted are at predetermined relative positions to that data value in the array of data values.

6. A method according to clause 5, in which for each data value of the set of data values, the relative positions of the one or more other data values from which that data value is predicted depend upon the position within the array of data values of the data value to be predicted.

7. A method according to clause 5 or clause 6, in which the data values represent image data.

8. A method according to clause 7, comprising the steps of:
   predicting an image region for an image to be encoded; and
   generating a residual image region dependent upon the difference between the predicted image region and a corresponding region of the image to be encoded;
   in which the ordered array of data values comprises data values of a representation of the residual image region.

9. A method according to clause 8, in which the ordered array of data values comprises data values of a frequency transformed representation of the residual image region in which the residual image region has been subjected to a series of one or more frequency transformations.

10. A method according to clause 9, in which the frequency transform comprises one or more of:
   a discrete cosine transform (DCT);
   a discrete sine transform (DST);
   a DCT in one direction and a DST in an orthogonal direction; and
   a first transform followed by a non-separable secondary transform.

11. A method according to clause 8, in which the ordered array of data values comprises data values of a reordered representation of the residual image region in a transform skip mode.

12. A method according to any one of clauses 8 to 11, in which the step of predicting an image region for an image to be encoded comprises predicting samples of the image region in dependence upon other previously encoded and decoded samples of the image, displaced from the predicted samples in a direction defined by a prediction mode.

13. A method according to clause 12, in which, for each data value of the set of data values, the relative positions of the one or more other data values from which that data value is predicted depend upon the prediction mode applicable to the array of data values.

14. A method according to clause 12 or clause 13, in which, for each data value of the set of data values, the property of the one or more other data values from which that data value is predicted depend upon one or more selected from the list consisting of:
   the prediction mode applicable to the array of data values;
   the array size of the array of data values;
   the shape of the array of data values; and
   a location of that data value within the array of data values.

15. A method according to any one of the preceding clauses, comprising performing the predicting and encoding steps for data values of the array according to an array processing order.

16. A method according to clause 15, comprising steganographically encoding the data value sign for a first data value in the array processing order, amongst the data representing data value magnitudes.

17. Computer software which, when executed by a computer, causes the computer to perform the method of any one of the preceding clauses.

18. A machine-readable non-transitory storage medium which stores computer software according to clause 17.

19. Data encoding apparatus comprising:
    an encoder configured to encoding an ordered array of data values as data representing a data value magnitude and data representing a data value sign; and
    a predictor configured to predict, for a set of data values comprising at least some of the data values, the respective data value sign from a property of one or more other data values in the ordered array;
    the encoder being configured to encode the data value sign for the set of data values in dependence upon the respective predicted value.

20. Video storage, capture, transmission or reception apparatus comprising apparatus according to clause 19.

21. A data decoding method comprising:
    decoding an ordered array of data values as data representing a data value magnitude and data representing a data value sign;
    predicting, for a set of data values comprising at least some of the data values, the respective data value sign from a property of one or more other data values in the ordered array; and
    decoding the data value sign for the set of data values in dependence upon the respective predicted value.

22. A method according to clause 21, in which the step of decoding the data value sign comprises performing context adaptive decoding in which the context depends upon the predicted data value sign.

23. A method according to clause 21 or clause 22, in which the property of one or more other data values comprises the sign of the one or more other data values.

24. A method according to any one of clauses 21 to 23, in which the property of one or more other data values comprises the magnitude of the one or more other data values.

25. A method according to any one of clauses 21 to 24, in which, for each data value of the set of data values, the one or more other data values from which that data value is predicted are at predetermined relative positions to that data value in the array of data values.

26. A method according to clause 25, in which for each data value of the set of data values, the relative positions of the one or more other data values from which that data value is predicted depend upon the position within the array of data values of the data value to be predicted.

27. A method according to clause 25 or clause 26, in which the data values represent image data.

28. A method according to clause 27, comprising the steps of:
    predicting an image region for an image to be decoded;
    generating a residual image region indicative of differences between the predicted image region and a corresponding region of the image to be decoded;
    in which the ordered array of data values comprises data values of a representation of the residual image region; and
    combining the predicted image region and the residual image region.

29. A method according to clause 28, in which the ordered array of data values comprises data values of a frequency transformed representation of the residual image region.

30. A method according to clause 29, in which the frequency transform comprises:
    a discrete cosine transform (DCT);
    a discrete sine transform (DST);
    a DCT in one direction and a DST in an orthogonal direction; and
    a first transform followed by a non-separable secondary transform.

31. A method according to clause 28, in which the ordered array of data values comprises data values of a reordered representation of the residual image region in a transform skip mode.

32. A method according to any one of clauses 28 to 31, in which the step of predicting an image region for an image to be decoded comprises predicting samples of the image region in dependence upon other previously decoded samples of the image, displaced from the predicted samples in a direction defined by a prediction mode.

33. A method according to clause 32, in which, for each data value of the set of data values, the relative positions of the one or more other data values from which that data value is predicted depend upon the prediction mode applicable to the array of data values.

34. A method according to clause 32 or clause 33, in which, for each data value of the set of data values, the property of the one or more other data values from which that data value is predicted depend upon one or more selected from the list consisting of:
    the prediction mode applicable to the array of data values;
    the array size of the array of data values;
    the shape of the array of data values; and
    a location of that data value within the array of data values.

35. A method according to any one of clauses 21 to 34, comprising performing the predicting and decoding steps for data values of the array according to an array processing order.

36. A method according to clause 35, comprising steganographically encoding the data value sign for a first data value in the array processing order, amongst the data representing data value magnitudes.

37. Computer software which, when executed by a computer, causes the computer to perform the method of clause 21.

38. A machine-readable non-transitory storage medium which stores computer software according to clause 37.

39. Data decoding apparatus comprising:
    a decoder configured to encoding an ordered array of data values as data representing a data value magnitude and data representing a data value sign; and
    a predictor configured to predict, for a set of data values comprising at least some of the data values, the respective data value sign from a property of one or more other data values in the ordered array;
    the decoder being configured to encode the data value sign for the set of data values in dependence upon the respective predicted value.

40. Video storage, capture, transmission or reception apparatus comprising apparatus according to clause 39.

41. Video capture apparatus comprising an image sensor and an encoder apparatus according to clause 19.

42. Video capture apparatus according to clause 41 further comprising an apparatus according to clause 39 and a display to which the data stream is output.

43. Video capture apparatus according to clause 41 comprising a transmitter configured to transmit an encoded data stream.

The invention claimed is:

1. A data encoding method comprising:

encoding an ordered array of data values in two or more modes, the data values representing DCT or DST coefficients in a first mode, and the data values representing a data value magnitude and data representing a data value sign in a second mode, the second mode being a transform skip mode;

detecting, for a data value in the second mode, respective data sign values from at least one data value in the ordered array; and deriving a context for encoding the data value, wherein the detecting respective data sign values from at least one data value in the ordered array comprises detecting sign values for a horizontally adjacent data value and a vertically adjacent data value.

2. The data encoding method as claimed in claim 1, wherein the context is based on the detected respective data sign values.

3. The data encoding method as claimed in claim 2, the method further comprising encoding the data value sign using the derived context.

4. The data encoding method as claimed in claim 2, wherein the detecting respective data sign values from at least one data value in the ordered array comprises detecting sign values for nearby, already encoded data values.

5. The data encoding method as claimed in claim 1, wherein the deriving the context comprises using a lookup function on the detected respective data sign values.

6. The data encoding method as claimed in claim 5, wherein the lookup function is configured to determine which of a plurality of contexts are selected based on whether the detected respective data sign values are opposite or whether the detected respective data sign values are equal and the method further comprises encoding data values based on the selected context.

7. The data encoding method as claimed in claim 5, wherein the lookup function for determining which of a plurality of contexts is selected is further dependent upon a detected prediction mode for the data values.

8. A data encoding apparatus comprising circuitry configured to:

encode an ordered array of data values in two or more modes, the data values representing DCT or DST coefficients in a first mode, and the data values representing a data value magnitude and data representing a data value sign in a second mode, the second mode being a transform kip mode;

detect, for a data value in the second mode, respective data sign values from at least one data value in the ordered array; and derive a context for encoding the data value, wherein the detecting respective data sign values from at least one data value in the ordered array comprises detecting sign values for nearby, already decoded data values.

9. A data decoding method comprising:

decoding an ordered array of data values in two or more modes, the data values representing DCT or DST coefficients in a first mode, and the data values representing a data value magnitude and data representing a data value sign in a second mode, the second mode being a transform skip mode;

detecting, for a data value in the second mode, respective data sign values from at least one data value in the ordered array; and deriving a context for decoding the data value, wherein the detecting respective data sign values from at least one data value in the ordered array comprises detecting sign values for nearby, already decoded data values.

10. The data decoding method as claimed in claim 9, wherein the context is based on the detected respective data sign values.

11. The data decoding method as claimed in claim 9, the method further comprising decoding the data value sign using the derived context.

12. The data decoding method as claimed in claim 9, wherein the detecting respective data sign values from at least one data value in the ordered array comprises detecting sign values for a horizontally adjacent data value and a vertically adjacent data value.

13. The data decoding method as claimed in claim 12, wherein the deriving the context comprises using a lookup function on the detected respective data sign values.

14. The data decoding method as claimed in claim 13, wherein the lookup function is configured to determine which of a plurality of contexts are selected based on whether the detected respective sign values are opposite or whether the detected respective sign values are equal and the method further comprises decoding data values based on the selected context.

15. The data decoding method as claimed in claim 13, wherein the lookup function for determining which of a plurality of contexts is selected is further dependent upon a detected prediction mode for the data values.

16. A non-transitory storage medium having stored thereon code components which when executed by a computer cause the computer to perform the method as claimed in claim 9.

17. A data decoding apparatus comprising circuitry configured to:

decode an ordered array of data values in two or more modes, the data values representing DCT or DST coefficients in a first mode, and the data values representing a data value magnitude and data representing a data value sign in a second mode, the second mode being a transform skip mode;

detect, for a data value in the second mode, respective data sign values from at least one data value in the ordered array; and derive a context for decoding the data value, wherein the detecting respective data sign values from at least one data value in the ordered array comprises detecting sign values for nearby, already decoded data values.

18. A video storage, capture, transmission or reception apparatus configured to use the data decoding apparatus according to claim 17.

\* \* \* \* \*